US007854115B2

(12) United States Patent
Pack et al.

(10) Patent No.: US 7,854,115 B2
(45) Date of Patent: Dec. 21, 2010

(54) POST-PRESSURE COMPENSATED HYDRAULIC CONTROL VALVE WITH LOAD SENSE PRESSURE LIMITING

(75) Inventors: Andreas S. Pack, Hartland, WI (US); Lynn Russell, Eagle, WI (US)

(73) Assignee: HUSCO International, Inc., Waukesha, WI (US)

( * ) Notice: Subject to any disclaimer, the term of this patent is extended or adjusted under 35 U.S.C. 154(b) by 469 days.

(21) Appl. No.: 12/109,726

(22) Filed: Apr. 25, 2008

(65) Prior Publication Data

US 2009/0266070 A1 Oct. 29, 2009

(51) Int. Cl.
*F16D 31/02* (2006.01)
*F15B 13/042* (2006.01)

(52) U.S. Cl. .......................................... 60/422; 91/446

(58) Field of Classification Search ................... 60/422; 91/446, 448

See application file for complete search history.

(56) References Cited

U.S. PATENT DOCUMENTS 4,693,272 A 9/1987 Wilke
5,000,001 A 3/1991 Christensen et al.
5,067,389 A 11/1991 Germain
5,146,747 A 9/1992 Sugiyama et al.
5,161,373 A 11/1992 Morikawa et al.
5,211,196 A 5/1993 Schwelm
5,347,811 A 9/1994 Hasegawa et al.
5,415,199 A 5/1995 Claudinon et al.
5,579,642 A 12/1996 Wilke et al.
5,609,089 A 3/1997 Leidinger
5,664,417 A 9/1997 Wilke
5,791,142 A 8/1998 Layne
6,098,403 A 8/2000 Wilke
6,854,270 B2 * 2/2005 Zenker et al. ................. 60/422
7,182,097 B2 2/2007 Bani

* cited by examiner

*Primary Examiner*—Michael Leslie
(74) *Attorney, Agent, or Firm*—Quarles & Brady LLP; George E. Haas

(57) ABSTRACT

An array of valve sections in a hydraulic system are connected to a supply line, a tank return line, and a load sense line. One valve sections includes a control valve with a metering orifice through which fluid flows from the supply line to a valve outlet. A load sense node is coupled by a load sense orifice to the load sense line. A load sense pressure limiter prevents pressure at the load sense node from exceeding a threshold level. A pressure compensator is connected in a fluid path between the valve outlet and one of the hydraulic actuators. The pressure compensator opens and closes the fluid path in response to pressure at the valve outlet and pressure at the load sense node, thereby governing the maximum amount of pressure that the respective valve section can apply to the hydraulic actuator.

14 Claims, 2 Drawing Sheets

POST-PRESSURE COMPENSATED HYDRAULIC CONTROL VALVE WITH LOAD SENSE PRESSURE LIMITING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to valve assemblies which control the flow and pressure of fluid to hydraulically power a machine; and more particularly to pressure compensated valves wherein a fixed differential pressure is to be maintained to achieve a uniform flow rate.

2. Description of the Related Art

Agricultural, construction and industrial machinery have components that are moved by hydraulic actuators, such as cylinder and piston arrangements. Application of hydraulic fluid to the hydraulic actuator is often controlled by a valve with spool that is moved by a manually operated lever or an electric solenoid. Movement of the spool into various positions within a valve body proportionally varies the flow of pressurized fluid from a pump to one chamber of the cylinder and controls fluid draining from another cylinder chamber. Typically a plurality of valves for operating different hydraulic actuators were combined side by side in sections of a larger valve assembly.

The speed of a hydraulically driven component on the machine depends upon the cross-sectional areas of control orifices in the spool valve and the pressure drop across those orifices. To facilitate control, pressure compensating hydraulic control systems have been designed to set and maintain the pressure drop. These previous control systems include load sense lines which transmit the pressure at the valve workports to the input of a variable displacement hydraulic pump which supplies pressurized hydraulic fluid in the system. The resulting self-adjustment of the pump output provides an approximately constant pressure drop across a control orifice, the cross-sectional area of which is varied by the machine operator. This facilitates control because, with the pressure drop held constant, the speed of the machine component is determined only by the cross-sectional area of an operator variable metering orifice.

One such prior system is disclosed in U.S. Pat. No. 5,579,642 entitled "Pressure Compensating Hydraulic Control System". That system utilized a chain of shuttle valves to sense the pressure at every powered workport of each valve section and to choose the highest of those workport pressures, as a "load sense pressure". The resultant load sense pressure was applied to an isolator valve which connected the control input of the pump to either the pump output or to the system tank depending upon that workport pressure. The isolator valve was contained in a separate, special end section of the valve assembly.

The control pressure applied to the pump's control input also was applied to a separate pressure compensating valve located in each valve section between the metering orifice of the control valve and the load being driven. This arrangement was referred to a "post-pressure compensated hydraulic control valve" because the compensation was located after, or downstream of, the metering orifice. The pressure compensating valve responded to the control pressure by creating a substantially fixed differential pressure across the spool. When the flow demand for a valve section exceeded the available flow supply, the pressure compensating valve in the valve sections split the available flow among the valve sections in proportion to the metering orifices in the respective spools.

In the prior post-pressure compensation technique, the pressure compensating valve in every valve section received the same control signal that was derived from the load sense signal. For certain machines, however, it is desirable to limit individually the load sense pressure controlling the pressure compensating valve in selected valve sections. Heretofore individual limiting was difficult to accomplish in a post-pressure compensation system because limiting the load sense pressure signal in one valve section often affected all the valve sections.

SUMMARY OF THE INVENTION

A hydraulic system has an array of valve sections that control flow of fluid from a supply line to different hydraulic actuators, such as cylinder/piston arrangements. Pressure of the fluid in the supply line from a pump is regulated in response to pressure in a load sense line which is the greatest load pressure from among all the valve sections. Preferably each valve section also controls the flow of fluid back from the associated hydraulic actuator to a tank return line.

At least one of the valve sections has a pressure compensator controlled by a modified load sense pressure that is individually pressure limited. That one valve section includes a control valve, such as a conventional spool valve for example, with a metering orifice through which fluid from the supply line flows to a valve outlet. A load sense node is coupled by a load sense orifice to the load sense line. A load sense pressure limiter is operably connected to prevent pressure at the load sense node from exceeding a predefined threshold level. The load sense orifice prevents the limited pressure at the load sense node from affecting the pressure in the load sense line.

A pressure compensator is connected in a fluid path between the valve outlet and one of the hydraulic actuators. The pressure compensator opens and closes the fluid path in response to pressure at the compensator outlet and pressure at the load sense node, thereby governing the maximum amount of pressure that the respective valve section can apply to the hydraulic actuator.

In one embodiment, the pressure compensator comprises a valve that closes the fluid path upon pressure at the valve outlet exceeding pressure at the load sense node.

In another embodiment, operation of the pressure compensator is in part controlled by a selection valve. The selection valve has a first inlet connected to the load sense line, a second inlet connected to the supply line, and a selection outlet. The selection valve connects the first inlet to the selection outlet, except in response to pressure in the load sense line exceeding pressure at the load sense node at which time the second inlet is connected to the selection outlet. The selection outlet is connected to apply pressure to the pressure compensator which opens when pressure at the valve outlet exceeds pressure from the selection outlet.

In a preferred embodiment, the one valve section also comprises a load sense feedback valve that applies pressure from the supply line to the load sense line when a load pressure controlled by the pressure compensator is greater than the existing pressure in the load sense line. Other valves sections have similar mechanisms that ensure that the pressure in the load sense line is equal to the greatest load pressure among the plurality of valve sections.

DETAILED DESCRIPTION OF THE INVENTION

Figure 1:
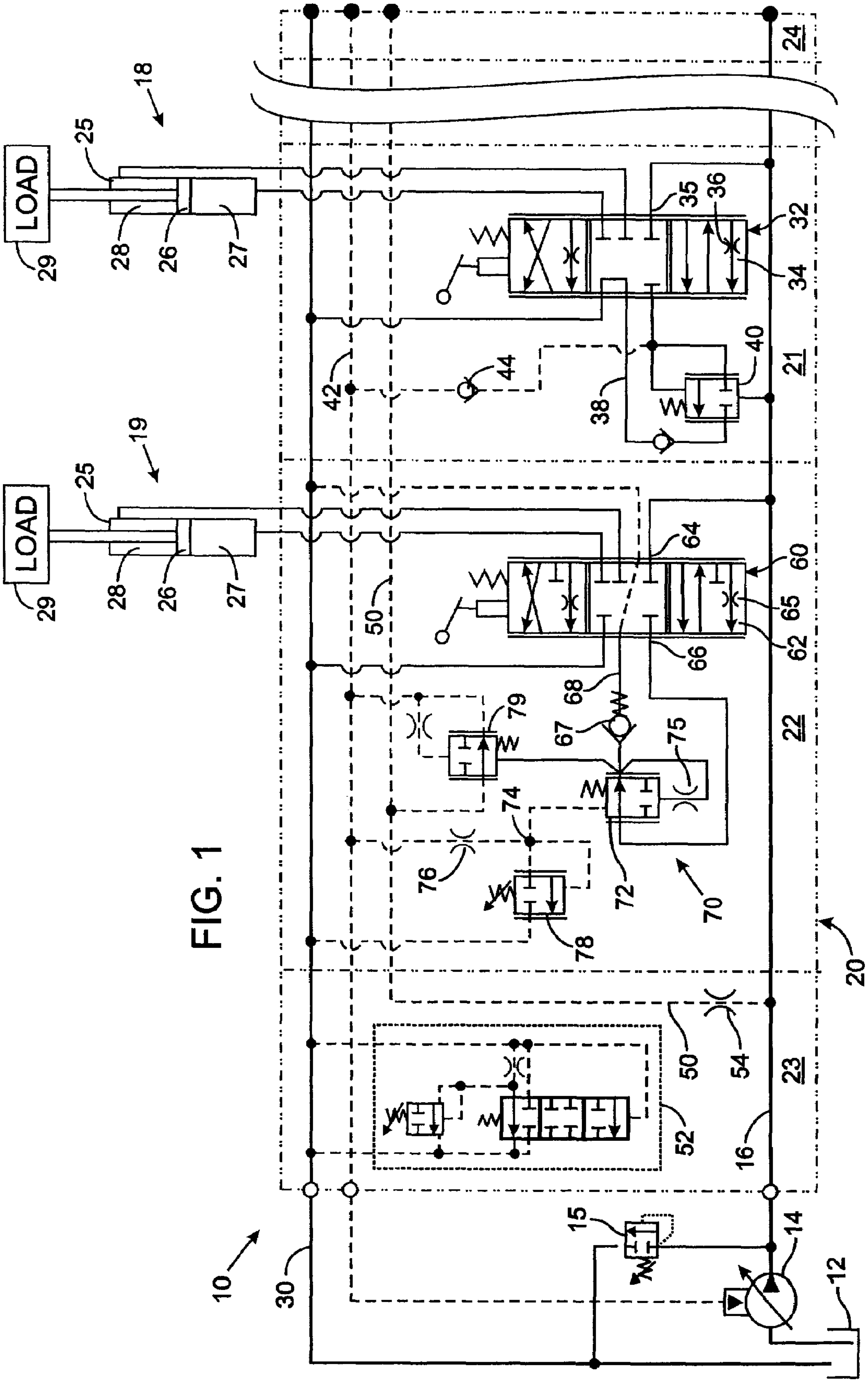
FIG. 1 is a schematic diagram of a hydraulic system that employs a post-pressure compensated valve assembly in which the load sense pressure used in one valve section is individually limited.

With initial reference to FIG. 1, a hydraulic system 10 controls motion of hydraulically powered working members of a machine, such as the boom, arm, and bucket of a backhoe. Hydraulic fluid is held in a reservoir, or tank, 12 from which the fluid is drawn by a conventional load sensing, variable displacement pump 14 and fed under pressure into a supply line 16. Pressure in the supply line is limited by a first pressure relief valve 15. The supply line 16 furnishes the pressurized fluid to a valve assembly 20 that controls the flow of that fluid to a plurality of hydraulic actuators 18 and 19. The valve assembly 20 comprises first and second individual valve sections 21 and 22 interconnected side-by-side between two end sections 23 and 24, although more valve sections may be provided as needed for operating additional hydraulic actuators.

Each hydraulic actuator 18 and 19 has a cylinder 25 containing a piston 26 that divides the housing interior into a head chamber 27 and a rod chamber 28 to which chambers pressurized fluid is applied to move the piston. The fluid returns from those hydraulic actuators back through the valve assembly 20 into a tank return line 30 that leads to the tank 12. The piston 26 is attached to a load 29 that is being operated by the respective hydraulic actuator 18 or 19.

The first valve section 21 has a conventional design and employs a previously known pressure compensation technique. A three-position, first control valve 32 has a first spool 34 that is shifted into different operating positions by either a manual operator lever or an electric solenoid, for example. The first control valve 32 has an inlet port 35 connected to the supply line 16 and an outlet port coupled to the tank return line 30. A pair of workports of the first control valve 32 are connected to the head and rod chambers 27 and 28 of the first hydraulic actuator 18. Moving the first spool 34 into one position applies pressurized fluid from the supply line 16 to the head chamber 27 and conveys fluid from the rod chamber 28 to the tank return line 30. In another position of the first spool 34 the supply line 16 fluid flows into the rod chamber 28 and fluid from the head chamber 27 flows to the tank return line 30. In the illustrated center, or neutral, position of the spool the first hydraulic actuator 18 is disconnected from both the supply line 16 and the tank return line 30.

The first control valve 32 has a metering orifice 36 the size of which is varied by moving the first spool 34 to proportionally control the flow of fluid from the supply line to the first hydraulic actuator 18. The metering orifice 36 couples the inlet port 35 to a bridge passage 38. A conventional first pressure compensator valve 40 is located in the bridge passage 38. The first pressure compensator valve 40 controls the flow of fluid through the bridge passage 38 in response to a pressure differential between the supply line 16 and the outlet of the metering orifice 36. The pressure at the metering orifice outlet also is communicated through a check valve 44 to a load sense line 42 that extends through the sections of the valve assembly 20. The check valve 44 opens when the pressure at the metering orifice outlet of the first control valve 32 is greater than the metering orifice outlet pressures from the other valve sections that are similarly applied to the load sense line 42.

The load sense line 42 extends into the first end section 23, in which a pressure compensated drain regulator 52 couples the load sense line 42 to the tank return line 30. When all the actuators 18 and 19 are inactive, the pressure compensated drain regulator 52 bleeds off pressure in the load sense line 42, thereby reducing the pump output at that time. The pressure compensated drain regulator 52 incorporates a relief valve which limits pressure in the load sense line 42 from reaching an unacceptable level. In the first end section 23, an auxiliary supply line 50 is connected to the supply line 16 through an orifice 54 that limits the maximum flow between those lines. The auxiliary supply line 50 extends through the other valves sections 21 and 22 terminating at the second end section 24.

The second valve section 22 includes a three-position, second control valve 60 with a second spool 62 that is shifted into different operating positions by either a manual operator lever or an electric solenoid, for example. The second control valve 60 has an inlet port 64 connected to the supply line 16 and an outlet port coupled to the tank return line 30. A pair of workports of the second control valve 60 are connected to the head and rod chambers 27 and 28 of the second hydraulic actuator 19. Moving the second spool 62 into one position applies pressurized fluid from the supply line 16 to the head chamber 27 of the second hydraulic actuator 19 and conveys fluid from the rod chamber 28 to the tank return line 30. In another position of the second spool 62, the supply line 16 fluid flows into the rod chamber 28 and fluid from the head chamber 27 flows to the tank return line 30. In the illustrated center, or neutral, position of the second spool 62 the first hydraulic actuator 18 is disconnected from both the supply line 16 and the tank return line 30. The second control valve 60 has a second metering orifice 65, the size of which is varied by moving the second spool 62 to proportionally control the flow of fluid from the supply line 16 to the second hydraulic actuator 19. The second metering orifice 65 couples the inlet port 64 to a spool outlet 66.

The second valve section 22 incorporates a novel first pressure compensation circuit 70 that is operated by a load sense pressure which can be set to a pressure limit independently of the other valve sections. This first pressure compensation circuit 70 comprises a second pressure compensator valve 72 operably connected to control the fluid flow through a load holding check valve 67 and a second bridge passage 68. The second pressure compensator valve 72 responds to a pressure differential between the compensator outlet pressure and pressure in a load sense node 74. Specifically the second pressure compensator valve 72 has a valve element to one side of which the outlet pressure from the compensator is applied through an orifice 75 and the pressure in the load sense node 74 is applied along with a spring force to the opposite side of that valve element. The spring force and pressure from the load sense node bias the second pressure compensator valve 72 toward the open position.

The load sense node 74 is coupled to the load sense line 42 via a load sense orifice 76 (e.g., 0.5 mm). Pressure in the load sense node 74 is determined by a load sense pressure limiter 78, which preferably is an adjustable relief valve that opens when pressure in the load sense node exceeds a threshold level. Thus the load sense pressure limiter 78 prevents the pressure in the load sense node 74 to being no greater than that predefined threshold level. Pressure at the load sense node 74 also can be controlled via an adjustable relief valve in a remote location that is external to the main control valve assembly 20.

When the load sense line 42 has a relatively low pressure level (i.e. less than the threshold of the load sense pressure limiter 78), that pressure level is applied through the load sense orifice 76 to the second pressure compensator valve 72. At such times, the operation of the second valve section 22 will be pressure compensated based on the full primary load sense pressure. Should the pressure in the load sense line 42 exceed the threshold of the load sense pressure limiter 78, that latter valve will open maintaining the pressure in the load sense node 74 at that pressure threshold level. At that time, operation of the second valve section 22 is pressure compensated based on the limited load sense pressure. The load sense orifice 76 is sized so to prevent the pressure limiting in the load sense node 74 from affecting pressure in the load sense line 42. As a consequence, the pressure compensation in the other valve sections, such as the first valve section 21, is based on the full primary load sense pressure. Therefore, the first pressure compensation circuit 70 enables the second valve section to have an independent pressure compensation limit that does not affect the other valve sections.

Other valve sections also can have a pressure compensation circuit similar to circuit 70 with independent pressure limits defined by the setting of their individual load sense pressure limiter 78. If multiple valve sections are to have the same pressure limit, only one of those valve sections can include the pressure compensation circuit 70 that is connected to a load sense node 74 which extends into the other valve sections.

A load sense feedback valve 79 in the second valve section 22 is connected between the auxiliary supply line 50 and the load sense line 42. The load sense feedback valve 79 is spring biased into the open position and stays open when pressure in the second bridge passage 68 at the outlet of the second pressure compensator valve 72 exceeds the pressure in the load sense line 42. When the load sense feedback 79 valve is open, the workport pressure of the second valve section 22 is greater that the workport pressures in the other valve sections, thereby ensuring that the greatest workport pressure will be applied to the load sense line 42 which controls the pressure output of the variable displacement pump 14. When the workport pressures of the other valve sections are greater than that of the second valve section 22, the higher load sense pressure from those other sections closes the load sense feedback valve 79.

Spring biasing the load sense feedback valve 79 into the open position has a secondary benefit of allowing some of the flow to drain into the load sense line 42 when the control valves 60 and 32 are in the neutral positions. This maintains a small amount of fluid flowing through the valve assembly 20, thereby providing a warming effect in cold weather. Another benefit is improved response due to the load sense feedback valve 79 already being in a state to feed fluid into the load sense line 42 when a control valve 60 or 32 is activated.

The load sense feedback valve 79 can operate without a bias spring, in which case the valve position is completely dependent on the pressure balance on either end of the load sense feedback valve. Alternatively, the load sense feedback valve 79 can be spring biased into the closed position.

Figure 2:
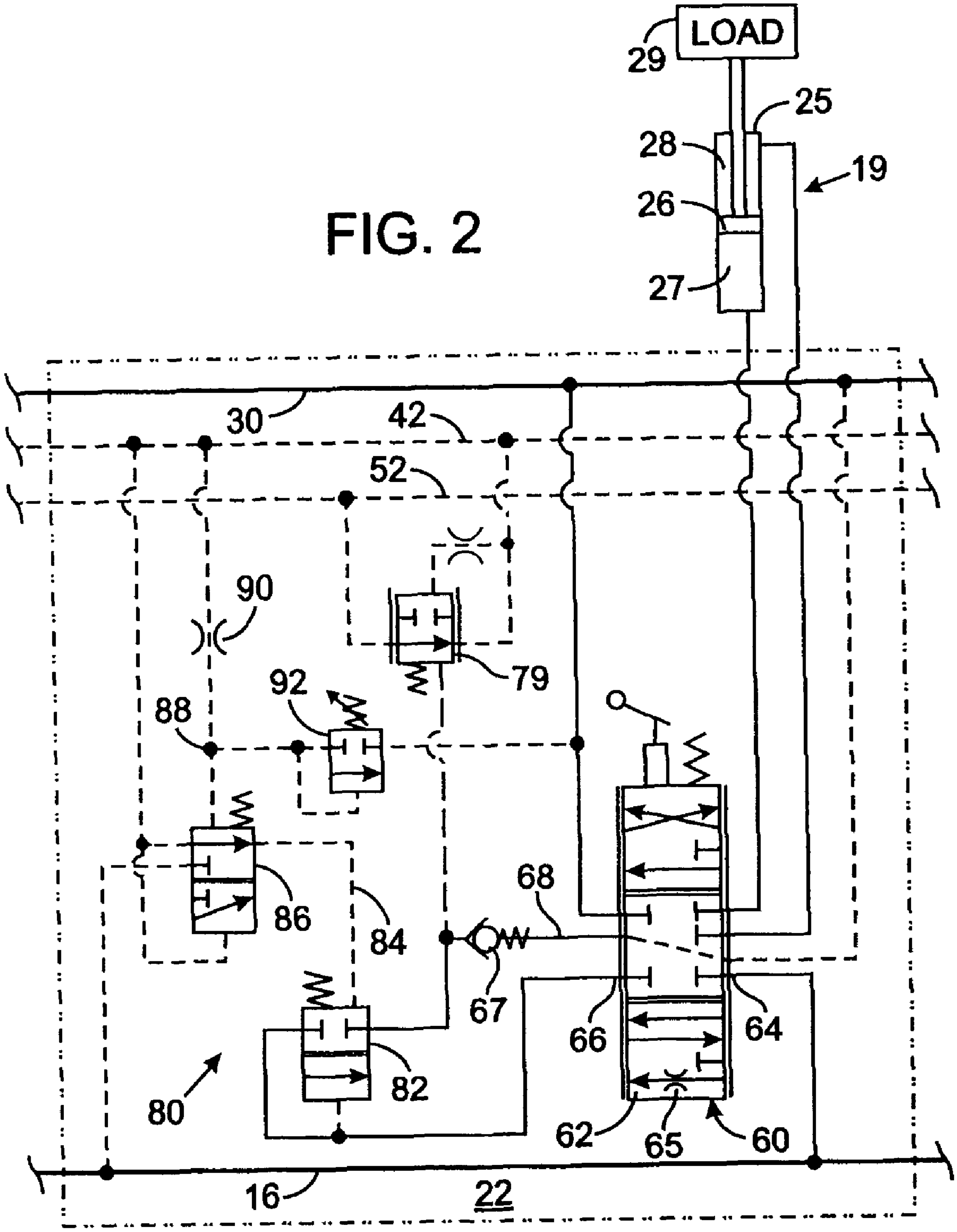
FIG. 2 is schematically depicts an alternative embodiment for independently limiting the load sense pressure used in a valve section.

With reference to FIG. 2, the second valve section 22 can employ a second pressure compensation circuit 80 in place of the first pressure compensation circuit 70. Components of the valve section in FIG. 2 that are the same as those in FIG. 1 have been assigned identical reference numerals. The second pressure compensation circuit 80 includes a third pressure compensator valve 82 operably connected to control the fluid flow through the second bridge passage 68. The third pressure compensator valve 82 responds to a pressure differential between the spool outlet 66 of the second metering orifice 65 and pressure in an intermediate passage 84. Specifically the third pressure compensator valve 82 includes a valve element to one side of which the metering orifice outlet pressure is applied and pressure in the intermediate passage 84 and force from a spring are applied to the opposite side of that valve element. The spring biases the third pressure compensator valve 82 into a closed state.

The pressure in the intermediate passage 84 is derived from operation of a two-position, three-way selection valve 86 that has an outlet connected directly to the intermediate passage. A first inlet of the selection valve 86 is connected to the load sense line 42 and a second inlet is connected to the supply line 16. Pressure from the load sense line 42 is applied to one side of the valve element in the selection valve 86. The opposite side of that valve element is acted on by a spring and is acted on by pressure a load sense node 88, that in turn is coupled by a load sense orifice 90 to the load sense line 42. The spring biases the selection valve 86 into a state in which the first inlet is connected to the outlet of the selection valve. Pressure in the load sense node 88 is determined by a load sense pressure limiter 92, which preferably is an adjustable relief valve that opens when pressure in the load sense node exceeds the desired level and relieves the excessive pressure into the tank return line 30. Thus the load sense pressure limiter 92 confines the pressure in the load sense node 88 to being no greater than that desired level. Pressure at the load sense node 88 also can be limited via an external relief valve at a remote location to the main control valve assembly 20.

At relatively low levels, the pressure in the load sense line 42 is applied through the load sense orifice 90 to both sides of the selection valve 86, which as a result connects the load sense line 42 to the intermediate passage 84. Thus the pressure in the load sense line is applied to the spring side of the third pressure compensator valve 82. At such times, the operation of the second valve section 22 is pressure compensated based on the full primary load sense pressure.

Should the pressure in the load sense line 42 exceed the threshold of the load sense pressure limiter 92, that latter valve will open, thereby maintaining the pressure in the load sense node 88 at that pressure threshold level. Thus the pressure applied to the spring side of the of the selection valve 86 also will be limited to that pressure threshold level. Because at this time, the pressure in the load sense line 42 is greater than the limited pressure in the load sense node 88, the selection valve 86 changes states so that the pressure from the supply line is conveyed into the intermediate passage 84. As a consequence, the supply line pressure is being applied to both sides of the third pressure compensator valve 82 which closes in response to the force of its bias spring. Closure of the third pressure compensator valve 82 limits the maximum pressure that can be supplied to the second hydraulic actuator 19.

When pressure in the load sense line 42 is greater than the threshold of the load sense pressure limiter 92, operation of the second valve section 22 is pressure compensated based on the limited load sense pressure at node 88. The size of the load sense orifice 90 (e.g., 0.5 mm) prevents that limited load sense pressure from affecting pressure in the load sense line 42 and operation of the other valve sections. Therefore, the second pressure compensation circuit 80 enables the second valve section 22 to have an pressure compensation limit that is independent of the other valve sections.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. In a hydraulic system having a plurality of valve sections each coupling a different one of a plurality of hydraulic actuators to both a supply line and a tank return line, wherein pressure in the supply line is controlled in response to pressure in a load sense line, at least one of the plurality of valve sections comprising:

a control valve with a metering orifice through which fluid from the supply line flows to a valve outlet;

a load sense node;

a load sense orifice coupling the load sense node to the load sense line;

a pressure compensator connected in a fluid path between the valve outlet and one of the plurality of hydraulic actuators and opening and closing the fluid path in response to a pressure at the valve outlet and pressure at the load sense node; and a load sense pressure limiter operably connected to prevent pressure at the load sense node from exceeding a predefined threshold level.

2. The pressure compensation apparatus as recited in claim 1 wherein the pressure compensator comprises a valve that closes the fluid path upon pressure at the valve outlet exceeding pressure at the load sense node.

3. The pressure compensation apparatus as recited in claim 1 wherein the pressure compensator comprises a valve that closes the fluid path upon pressure at the valve outlet exceeding pressure at the load sense node by a given amount.

4. The pressure compensation apparatus as recited in claim 1 wherein the load sense pressure limiter comprises relief valve that opens when pressure at the load sense node exceeds the predefined threshold level.

5. The pressure compensation apparatus as recited in claim 1 wherein the load sense pressure limiter comprises valve that provides a path between the load sense node and the tank return line when pressure at the load sense node exceeds the predefined threshold level.

6. The pressure compensation apparatus as recited in claim 1 further comprising a load sense feedback valve that applies pressure from the supply line to the load sense line in response to pressure controlled by the pressure compensator.

7. The pressure compensation apparatus as recited in claim 1 further comprising a selection valve having a first inlet connected to the load sense line, a second inlet connected to the supply line, and a selection outlet connected to operate the pressure compensator, wherein the selection valve connects the first inlet to the selection outlet, except in response to pressure in the load sense line exceeding pressure at the load sense node at which time the second inlet is connected to the selection outlet.

8. In a hydraulic system having a plurality of valve sections each coupling a different one of a plurality of hydraulic actuators to both a supply line and a tank return line, wherein pressure in the supply line is regulated in response to pressure in a load sense line, at least one of the plurality of valve sections comprising:

a spool valve connected to the supply line and the tank return line, and having a metering orifice through which fluid from the supply line flows to a spool outlet;

a load sense node;

a load sense orifice coupling the load sense node to the load sense line;

a pressure compensator valve connected in a fluid path between the spool outlet and one of the plurality of hydraulic actuators and opening and closing the fluid path in response to a pressure differential between the spool outlet and the load sense node; and a load sense pressure limiter valve providing a flow path between the load sense node and the tank return line when pressure at the load sense node exceeds a predefined threshold level.

9. The pressure compensation apparatus as recited in claim 8 wherein the pressure compensator valve closes the fluid path upon pressure at the spool outlet exceeding pressure at the load sense node by a given amount.

10. The pressure compensation apparatus as recited in claim 8 further comprising a load sense feedback valve that applies pressure from the supply line to the load sense line in response to pressure in a line between the pressure compensator valve and the one of the plurality of hydraulic actuators.

11. In a hydraulic system having a plurality of valve sections each coupling a different one of a plurality of hydraulic actuators to both a supply line and a tank return line, wherein pressure in the supply line is regulated in response to pressure in a load sense line, at least one of the plurality of valve sections comprising:

a spool valve connected to the supply line and the tank return line, and having a metering orifice through which fluid from the supply line flows to a spool outlet;

a load sense node;

a load sense orifice coupling the load sense node to the load sense line;

a load sense pressure limiter valve providing a flow path between the load sense node and the tank return line when pressure at the load sense node exceeds a predefined threshold level;

a selection valve having a first inlet connected to the load sense line, a second inlet connected to the supply line, and a selection outlet, wherein the selection valve connects the first inlet to the selection outlet, except in response to pressure in the load sense line exceeding pressure at the load sense node at which time the second inlet is connected to the selection outlet; and a pressure compensator valve connected in a fluid path between the spool outlet and one of the plurality of hydraulic actuators and opening and closing the fluid path in response to a pressure differential between the spool outlet and the selection outlet.

12. The pressure compensation apparatus as recited in claim 11 wherein the pressure compensator valve open the fluid path upon pressure at the spool outlet exceeding pressure at the selection outlet by a given amount.

13. The pressure compensation apparatus as recited in claim 11 wherein in order for the selection valve to connect the second inlet to the selection outlet, pressure in the load sense line must exceed pressure at the load sense node by a predefined amount.

14. The pressure compensation apparatus as recited in claim 11 further comprising a load sense feedback valve that applies pressure from the supply line to the load sense line in response to pressure in a line between the pressure compensator valve and the one of the plurality of hydraulic actuators.

* * * * *